(12) United States Patent
Lee et al.

(10) Patent No.: US 8,021,582 B2
(45) Date of Patent: Sep. 20, 2011

(54) METHOD FOR PRODUCING MICROPARTICLES IN A CONTINUOUS PHASE LIQUID

(75) Inventors: Gwo-Bin Lee, Tainan (TW); Cheng-Tso Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 241 days.

(21) Appl. No.: 12/548,365

(22) Filed: Aug. 26, 2009

(65) Prior Publication Data

US 2009/0315203 A1    Dec. 24, 2009

Related U.S. Application Data

(63) Continuation-in-part of application No. 11/338,193, filed on Jan. 23, 2006, now abandoned.

(51) Int. Cl.
*B29B 9/00* (2006.01)

(52) U.S. Cl. ............ 264/9; 264/11; 366/124; 516/9

(58) Field of Classification Search ............ None
See application file for complete search history.

(56) References Cited

U.S. PATENT DOCUMENTS

| | | | |
|---|---|---|---|
| 7,553,434 B2 * | 6/2009 | Kawai et al. | 264/14 |
| 7,718,099 B2 * | 5/2010 | Kawai et al. | 264/11 |
| 7,942,568 B1 * | 5/2011 | Branch et al. | 366/127 |
| 2001/0033796 A1 | 10/2001 | Unger et al. | |
| 2004/0066703 A1 * | 4/2004 | Sparey-Taylor et al. | 366/127 |
| 2005/0274423 A1 | 12/2005 | Oka et al. | |

* cited by examiner

*Primary Examiner* — Mary F Theisen
(74) *Attorney, Agent, or Firm* — Kilpatrick Townsend & Stockton LLP

(57) ABSTRACT

A continuous phase liquid and a dispersed phase liquid are permitted to flow together through a co-flow channel. Preferably, the dispersed phase liquid is arranged to flow within the flowing body of the continuous phase liquid in the co-flow channel so that the dispersed phase liquid is sheathed by the continuous phase liquid. The continuous phase and dispersed phase liquids are comminuted into microparticles in the co-flow channel by intermittently blocking the co-flow channel.

5 Claims, 10 Drawing Sheets

METHOD FOR PRODUCING MICROPARTICLES IN A CONTINUOUS PHASE LIQUID

CROSS-REFERENCE TO RELATED APPLICATION

This application is a CIP application of co-pending U.S. patent application Ser. No. 11/338,193 filed on Jan. 23, 2006, which is incorporated by reference.

BACKGROUND OF THE INVENTION

1. Field of the Invention

This invention relates to the production of microparticles, more particularly to a method for producing microparticles of a dispersed phase liquid in a continuous phase liquid.

2. Description of the Related Art

Application of biotechnology has been widely extended to many industrial fields, such as cosmetic and food industries in addition to the manufacture of pharmaceutical products. For example, microparticles have been produced based on biotechnology for nutritious foods in order to improve absorption of the nutritious foods by human bodies. Many methods and apparatuses have been suggested in the art for the production of microparticles.

Referring to FIGS. 1, 2 and 3, U.S. Pat. No. 6,177,479 discloses an apparatus for producing microspheres, which includes a housing 10 and a forming unit 20. The housing 10 includes a receiving space 11, and first, second and third channels 12, 14 and 16 all of which are connected to the receiving space 11.

The forming unit 20 is rectangular and includes opposite first and second faces 21 and 22. The first face 21 is recessed to form a rectangular recess 210, and a through hole 23 extends through the center of the first and second faces 21, 22 and the center of the recess 210. A row of protrusions 251 are spaced apart by microgaps and are formed on one of sidewalls 25 which surrounds the rectangular recess 210. The first face 21 is placed in contact with a wall surface of the receiving space 11 so that the second channel 14 is communicated with the through hole 23 and the rectangular recess 210.

In use, a first liquid is introduced into the first channel 12, whereas a second liquid is directed to the second channel 14. The first liquid flows into and fills the receiving space 11, and the second liquid flows through the through hole 23. After the rectangular recess 210 is filled, the increasing pressure in the recess 210 due to the continued inflowing of the second liquid will cause the second liquid to squeeze through the microgaps of the protrusions 251, thereby forming microspheres which are then dispersed in the first liquid in the receiving space 11.

In the aforesaid system, a surfactant is added to the second liquid in order to stabilize the microspheres of the second liquid in the first liquid. However, the aforesaid system requires a high pressure to pressurize the second liquid in the rectangular recess 210 and a tight fluid seal between the forming unit 20 and the housing 10. Otherwise, the second liquid can flow through other gaps than the microgaps, resulting in non-uniform liquid particles and/or failure to form microspheres.

Furthermore, since the size of the microspheres depends on the size of the microgaps, it is impossible to vary the size of the microspheres once the microgaps have been designed and constructed.

Other examples of the microsphere production are disclosed in U.S. Pat. Nos. 6,258,858, 6,576,023, 6,155,710 and 6,387,301.

U.S. 2005/0274423 A1 discloses several capillary chips used for mixing and reacting a sample with reagents. In FIG. 1A, a sample and a first reagent are mixed to undergo a reaction downstream of a junction P1 of two channels 31 and 32, a second reagent is mixed with the sample downstream of another junction P2, and a final reaction is completed at a position P3. Time period of the reaction of the sample with the first or second reagent is adjusted by making a valve part V1 in a closed state. This publication suggests nothing relating to the production of microparticles from immiscible liquids, such as a continuous phase liquid and a dispersed phase liquid.

U.S. 2001/0033796 A1 discloses various microfabricated elastomeric valve and pump systems for controlling microflows in microchannels. FIG. 27 of this publication illustrates a multiplexing system adapted to selectively permit fluid to flow through selected channels. This publication also suggests nothing relevant to the production of microparticles from immiscible liquids.

SUMMARY OF THE INVENTION

An object of the present invention is to provide a chip device which overcomes the disadvantages encountered with the aforesaid prior art.

Another object of the present invention is to provide a simple method of producing liquid micorparticles.

According to the present invention, a method of producing microparticles comprises: (a) providing a co-flow channel having upstream and downstream ends; (b) causing a dispersed phase liquid to flow into a flowing body of a continuous phase liquid at the upstream end of the co-flow channel, and allowing the dispersed phase liquid to flow into the co-flow channel together with the continuous phase liquid, wherein the dispersed phase liquid is sheathed by the continuous phase liquid within the co-flow channel; and (c) comminuting the continuous phase and dispersed phase liquids in the co-flow channel by intermittently moving a comminuting unit transversely into the co-flow channel to block the co-flow channel at intervals, wherein the microparticles of the dispersed phase liquid are formed within the continuous phase liquid.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
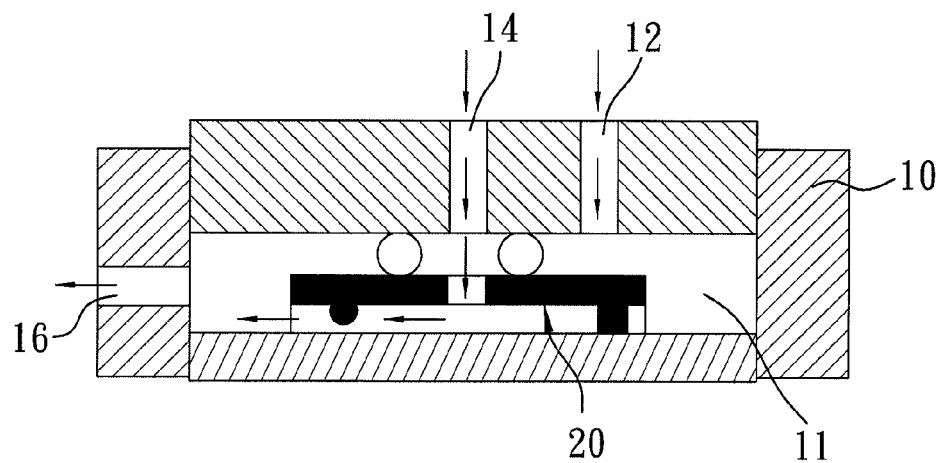
FIG. 1 is a sectional view of a conventional apparatus for manufacturing microspheres.
Figure 2:
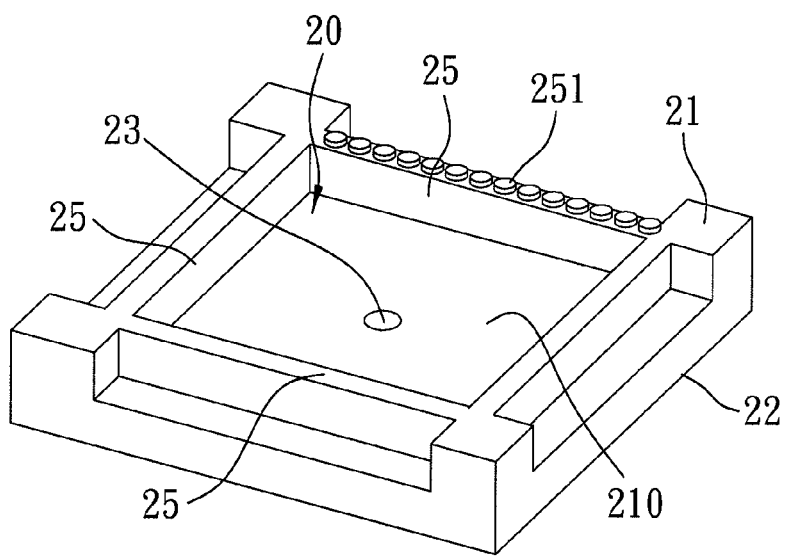
FIG. 2 is a perspective view of a forming unit of the apparatus of FIG. 1.
Figure 3:
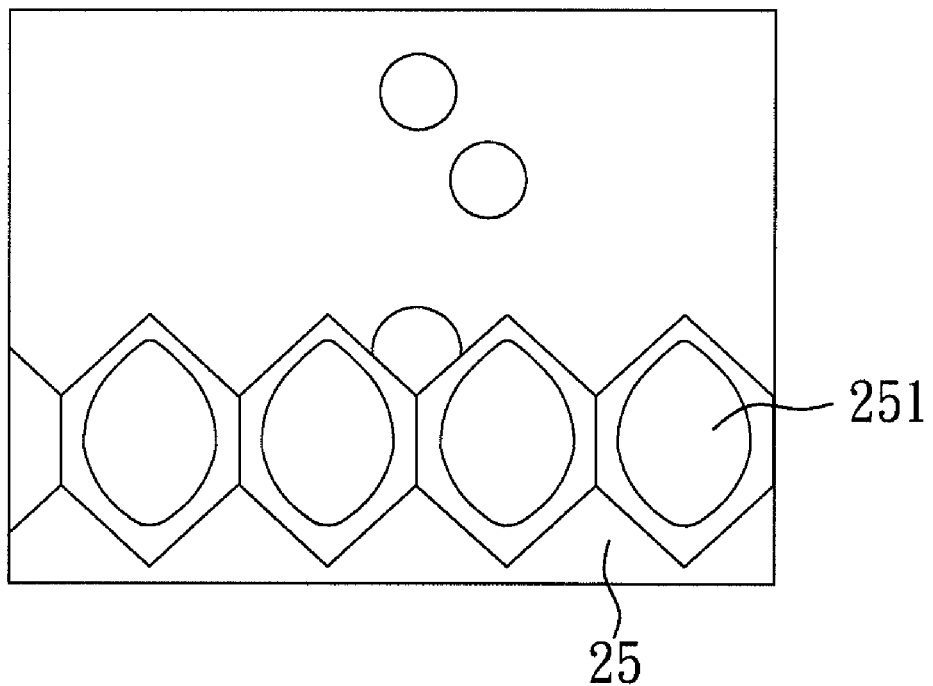
FIG. 3 is a view showing the formation of microspheres using the forming unit.
Figure 4:
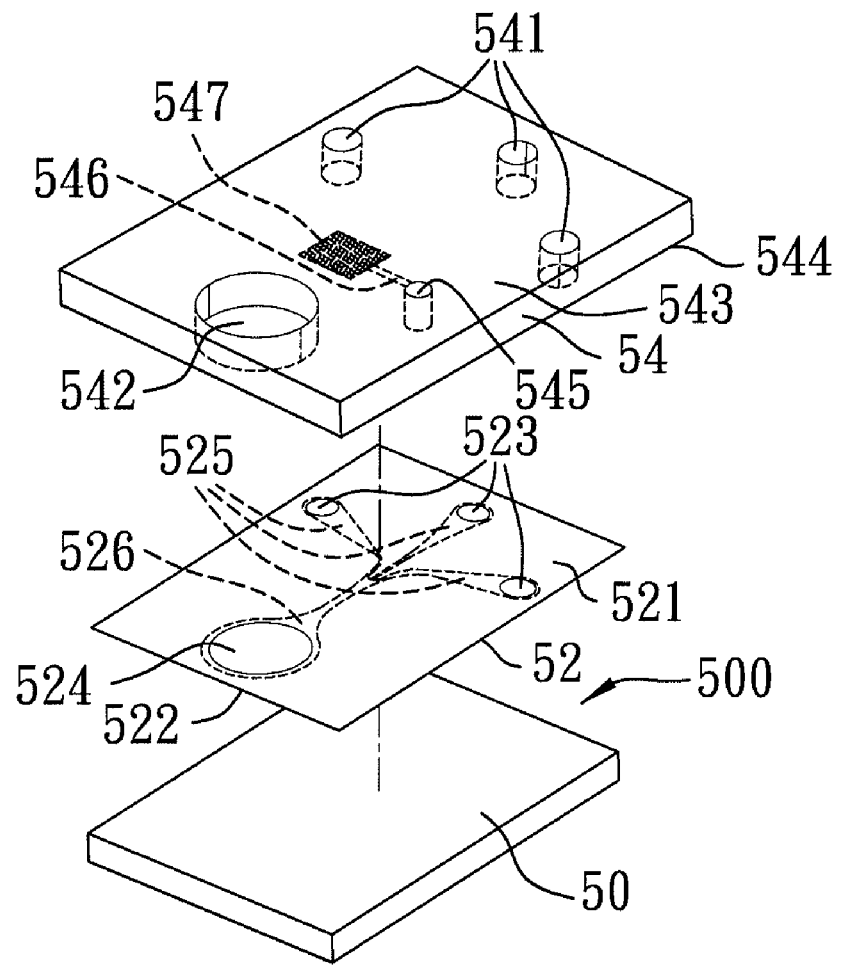
FIG. 4 is an exploded view of a chip device usable in a method according to the present invention.
Figure 5:
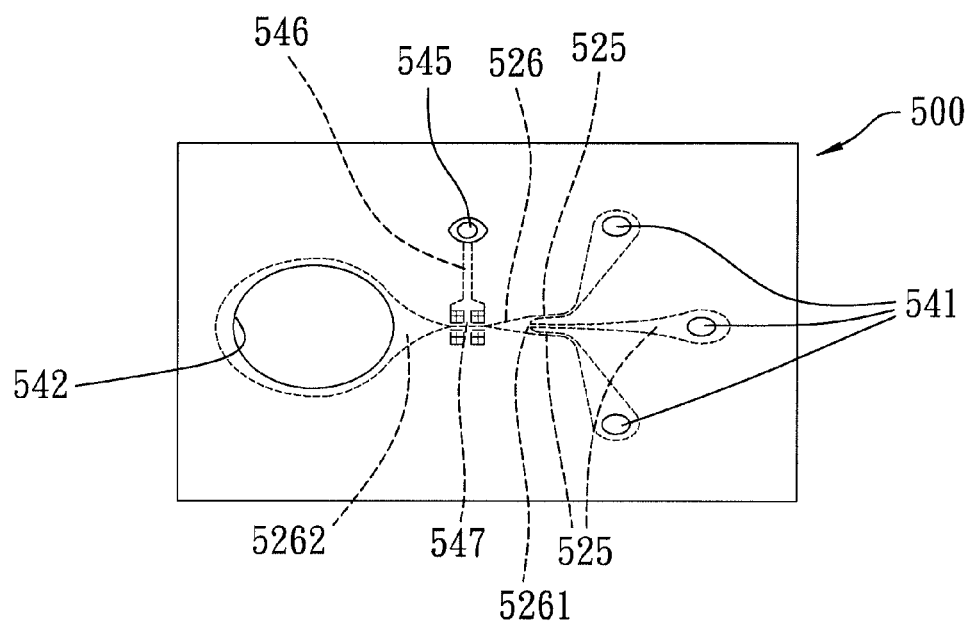
FIG. 5 is a plan view of the chip device of FIG. 4.

Referring to FIGS. 4 and 5, a chip device 500 that can be used in a method embodying the present invention includes a substrate 50, a liquid bearing layer 52 and a pressure layer 54. In this embodiment, the substrate 50 is a glass plate having a smooth surface. The liquid bearing layer 52 and the pressure layer 54 are made of polydimethylsiloxane (PDMS). However, the materials used in the present invention should not be limited. Materials other than the aforesaid materials may be used according to the present invention. The thickness of the liquid bearing layer 52 is smaller than that of the pressure layer 54.

The substrate layer 50 is substantially flat. The liquid bearing layer 52 is also flat and is superimposed over the substrate layer 50. The liquid bearing layer 52 includes three spaced apart first injection holes 523 which extend through top and bottom surfaces 521, 522 of the liquid bearing layer 52, a first collection chamber 524 which extends through the top and bottom surfaces 521, 522, three microchannels 525, and a co-flow channel 526. The microchannels 525 are connected respectively to the first injection holes 523 and extend toward the collection chamber 524. The co-flow channel 526 has an upstream end connected to all of the microchannels 525 and a downstream end connected to the collection chamber 524. One of the microchannels 525 is arranged to be disposed between the other two of the microchannels 525. Each microchannel 525 has a cross-section smaller than that of the co-flow channel 526. The microchannels 525 and the co-flow channel 526 extend through the bottom surface 522 and are covered by the substrate layer 50. The microchannels 525 and the co-flow channel 526 do not penetrate the top surface 521.

The pressure layer 54 is substantially flat and is superimposed over the liquid bearing layer 52. The pressure layer 54 includes three spaced apart second injection holes 541 which extend through top and bottom surfaces 543 and 544 of the pressure layer 54 and which are aligned and communicated with the respective first injection holes 523, a second collection chamber 542 which extends through the top and bottom surfaces 543 and 544 and which is aligned and communicated with the first collection chamber 524, a pressure inlet/outlet hole 545, a pressure supply channel 546, and a pressurizing channel unit 547. The pressure inlet/outlet hole 545 extends through the top and bottom surfaces of the pressure layer 54. The pressure supply channel 546 and the pressurizing channel unit 547 extend only through the bottom surface of the pressure layer 54 and are covered by the liquid bearing layer 52.

The pressurizing channel unit 547 includes a plurality of substantially parallel pressurizing channels 5471 (see FIGS. 7 and 7A) formed in the pressure layer 54. The pressurizing channels 5471 extend transversely of and over the co-flow channel 526 formed in the liquid bearing layer 52. The pressure supply channel 546 connects the pressure inlet/outlet hole 545 to all of the pressurizing channels 5471. As the pressurizing channels 5471 extend through the bottom surface 544 of the pressure layer 54 and as the co-flow channel 526 does not extend through the top surface 521 of the liquid bearing layer 52, the liquid bearing layer 52 has a membrane 528 (see FIG. 7) above the co-flow channel 526 or between the pressurizing channels 5471 and the co-flow channel 526. The membrane 528 cooperates with the pressurizing channels 5471 to constitute a comminuting unit for comminuting a continuous phase liquid and a dispersed phase liquid. The membrane 528 is resilient and deflectable.

The chip device 500 may be used for producing microparticles for a liquid. In use, the second injection holes 541 in the pressure layer 54 are connected to liquid storage tanks (not shown) and the pressure inlet/outlet hole 545 is connected to an air compressor (not shown) for supplying or withdrawing a compressed gas to or from the pressure supply channel 546 and the pressurizing channels 5471. The first and second collection chambers 524 and 542 are connected to an external collection tube (not shown). The purpose of providing a larger thickness for the pressure layer 54 is to facilitate connection with a piping system and to avoid leakage of gas and/or liquid.

A method of producing microparticles according to the present invention primarily includes the following steps: In a first step, the co-flow channel 526 having upstream and downstream ends 5261 and 5262 is provided. In a second step, a dispersed phase liquid is caused to flow into a flowing body of a continuous phase liquid at the upstream end of the co-flow channel, and is allowed to flow into the co-flow channel together with the continuous phase liquid. The dispersed phase liquid is sheathed by the continuous phase liquid within the co-flow channel. In a third step, the continuous phase and dispersed phase liquids are comminuted in the co-flow channel by intermittently moving the comminuting unit (the membrane 528 and the pressurizing channels 5471) transversely into the co-flow channel 526 to block the co-flow channel 526 at intervals. As a result, the microparticles of the dispersed phase liquid are formed within the continuous phase liquid.

In a preferred embodiment, the chip device 500 is used to produce the microparticles. The dispersed phase liquid is fed from the corresponding liquid storage tank (not shown) into the corresponding second and first injection holes 541 and 523 and is thereafter directed into one of the microchannels 525 (second microchannel) which is interposed between the other two microchannels 525 (first microchannel). The continuous phase liquid is fed from the corresponding liquid storage tank to the two first microchannels 525 through the respective second and first injection holes 541 and 523.

Figure 6:
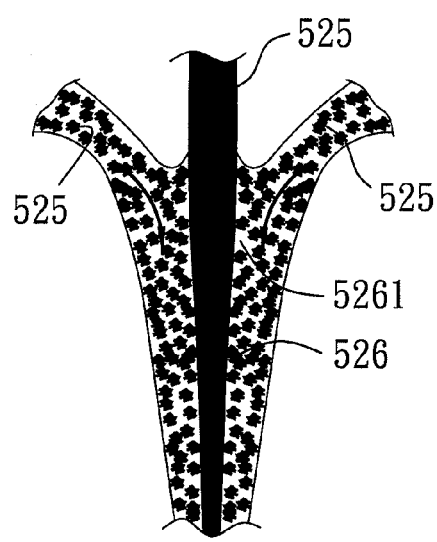
FIG. 6 is a schematic view showing a dispersed phase liquid flowing between two streams of a continuous phase liquid.

Referring to FIG. 6, as the three microchannels 525 meet together at the upstream end 5261 of the co-flow channel 526, the dispersed phase liquid flows into the flowing body of the continuous phase liquid at the upstream end 5261 of the co-flow channel 526. Therefore, the stream of the dispersed phase liquid is sandwiched and sheathed by the continuous phase liquid when flowing into the co-flow channel 526.

Figure 7:
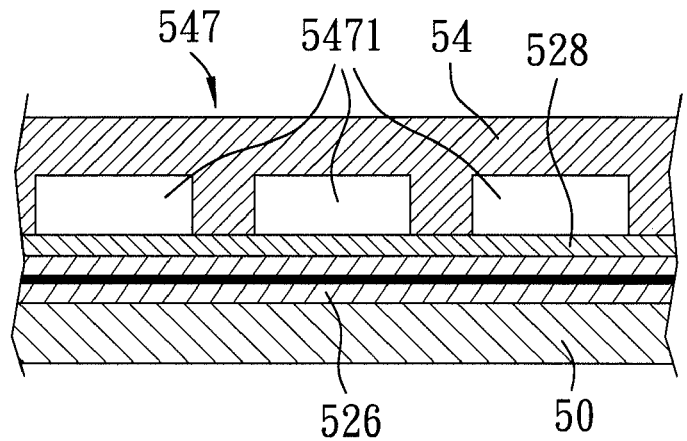
FIG. 7 is a fragmentary sectional view of the chip device of FIG. 4.
Figure 7A:
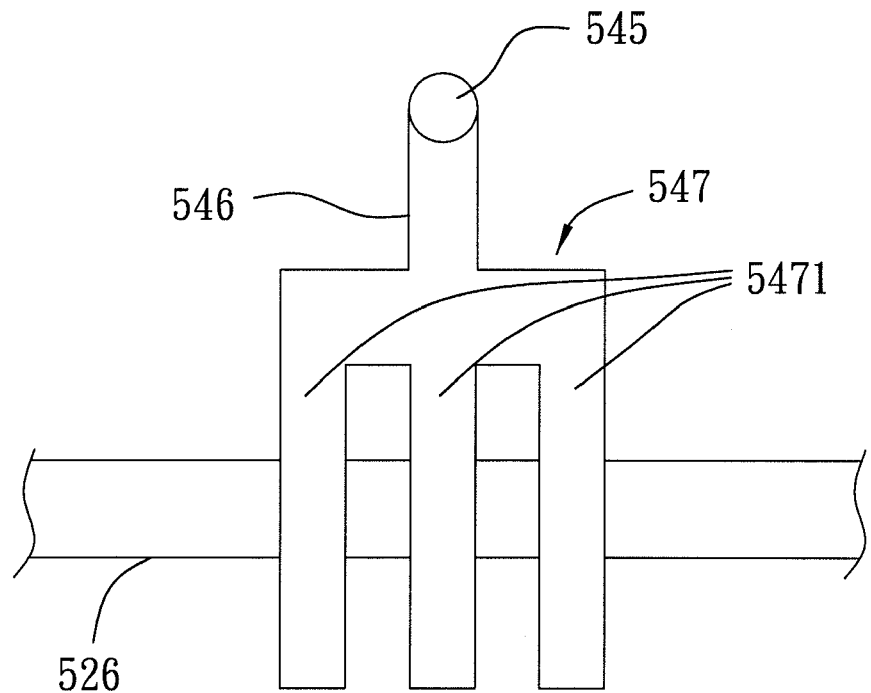
FIG. 7A is a schematic view showing a pressurizing channel unit of the chip device of FIG. 4.
Figure 8:
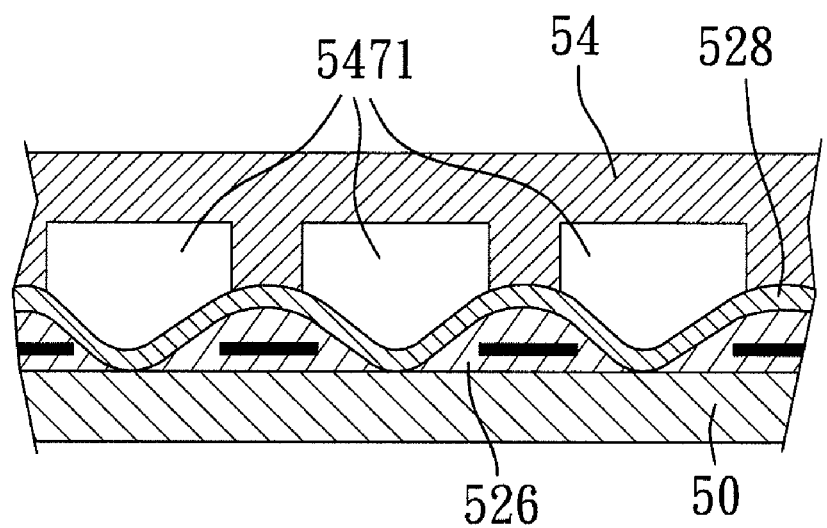
FIG. 8 is the same view as FIG. 7 but showing that a dispersed phase is divided by a comminuting member.
Figure 9:
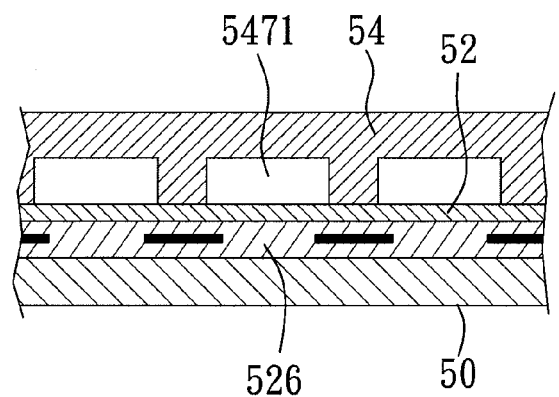
FIG. 9 is the same view as FIG. 7 but showing that the comminuting member returns to its original position after comminuting the dispersed phase liquid.

Referring to FIGS. 7, 8 and 9, the continuous phase and dispersed phase liquids flow in the co-flow channel 526 below the membrane 528 and the pressurizing channels 5471 of the comminuting unit. When compressed air is forced into the pressurizing channels 5471 simultaneously through the pressure inlet/outlet hole 545 and the pressure supply channel 546, the pressure in the pressurizing channels 5471 is increased simultaneously so that the pressurizing channels 5471 simultaneously pressurize the membrane 528 of the liquid bearing layer 52 and the membrane 528 is moved into the co-flow channel 526 in a direction transverse to the co-flow channel 526, as shown in FIG. 8. The co-flow channel 526 is therefore blocked at a plurality of spaced apart points simultaneously. At a result, the flowing stream of the continuous phase and dispersed phase liquids is comminuted into segments. When the pressure in the pressurizing channels 5471 is decreased, the membrane 528 is depressurized so that it moves outward from the co-flow channel 526 and returns to its original position, as shown in FIG. 9. The repeatedly increasing and decreasing the pressure of the pressurizing channels 5471 and the repetitive inward and outward movements of the membrane 528 can produce microparticles of the dispersed phase liquid which is dispersed in the continuous phase liquid. Of course, a surface-active agent should be added to one of the continuous phase liquid and the dispersed phase liquid in order to form and stabilize the microparticles. The microparticles as produced are collected in the first and second collection chambers 524 and 542.

While the flowing stream inside the co-flow channel 526 is comminuted by the membrane 528 which is actuated by the pressurizing channels 5471, the present invention should not be limited only thereto. The number of the pressurizing channels 5471 may be varied as desired. Furthermore, it is possible to use a single pressurizing channel in the present invention if the speed of the comminuting action of the membrane 528 is increased. Moreover, the flowing stream of the dispersed phase liquid may also be comminuted by any other suitable comminuting means which can move into the co-flow channel 526 to divide the flowing stream inside the co-flow channel 526.

Figure 10:
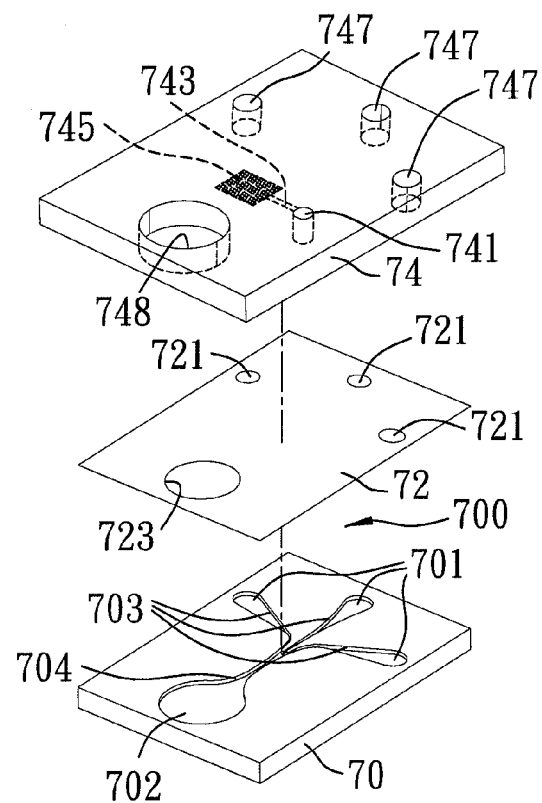
FIG. 10 is an exploded view of another chip device usable in the method according to the present invention.
Figure 11:
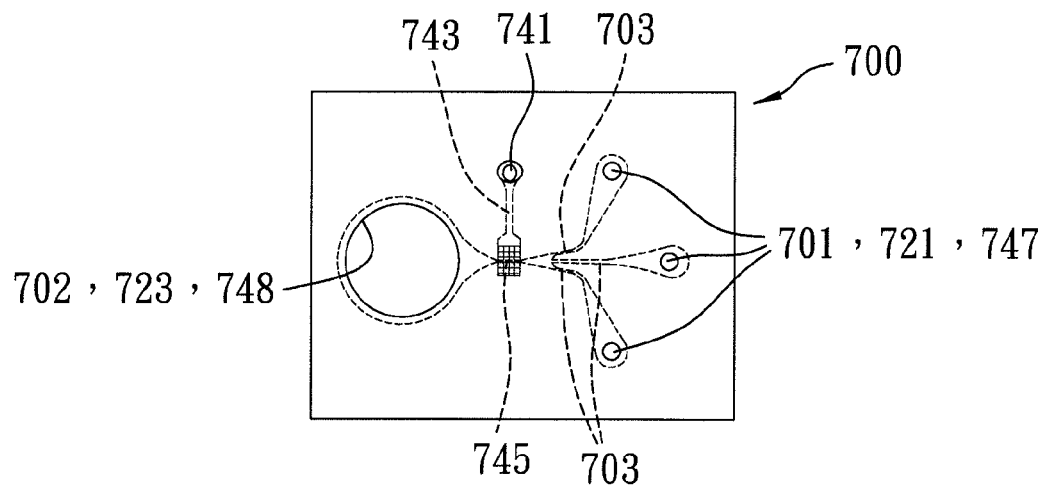
FIG. 11 is a plan view of the chip device of FIG. 10.
Figure 12:
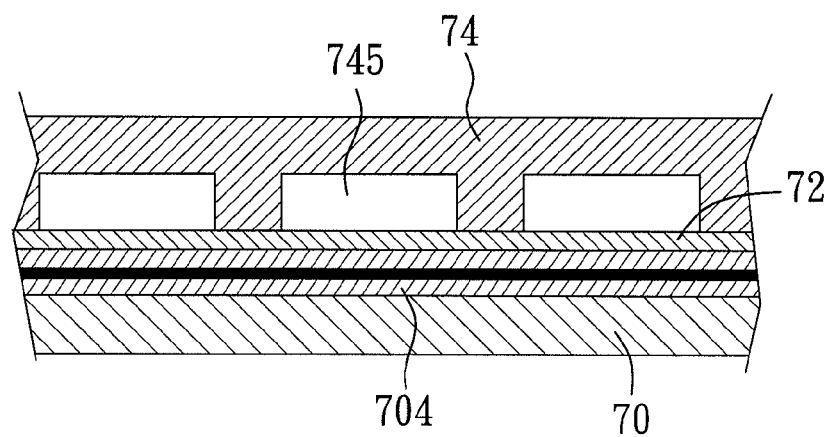
FIG. 12 is a fragmentary sectional view of the chip device of FIG. 10.

Referring to FIGS. 10, 11 and 12, there is shown another chip device 700 usable for the present invention. The chip device 700 includes a liquid bearing layer 70, a pressure layer 74, and an intermediate layer 72 disposed between the liquid bearing layer 70 and the pressure layer 74.

Unlike the liquid bearing layer 52 of the previous embodiment, the liquid bearing layer 70 in this embodiment has injection holes 701, microchannels 703, a co-flow channel 704 and a collection chamber 702 all of which extend through the top surface of the liquid bearing layer 70 but do not extend through the bottom surface thereof.

The pressure layer 74 of this embodiment is similar in construction to the pressure layer 54 of the previous embodiment, and includes a pressure inlet/outlet hole 741, a pressure supply channel 743, a pressurizing channel unit 745, injection holes 747, and a collection chamber 748.

The intermediate layer 72 is a membrane and includes three small holes which are respectively aligned and communicated with the injection holes 701 of the liquid bearing layer 70 and with the injection holes 747 of the pressure layer 74, and a large hole 723 which is aligned and communicated with the collection chamber 702 of the liquid bearing layer 70 and the collection chamber 748 of the pressure layer 74.

The comminuting unit in this embodiment is formed by the pressurizing channel unit 745 and a membrane portion of the intermediate layer 72 that is interposed between the pressurizing channel unit 745 and the co-flow channel 704.

As described above, the method of producing microparticles according to the present invention is simple and may be performed using a simple chip device of the present invention which does not require a large size high pressure supply system to operate the chip device 500, 700. Furthermore, the chip device 500, 700 may be constructed easily at low costs. By controlling the flow rates within the microchannels 525, 703, and by controlling the frequency of pressure changes inside the pressurizing channel unit 547, 745, the size of the microparticles produced by the chip device 500, 700 may be varied as desired.

EXAMPLE

Figure 13:
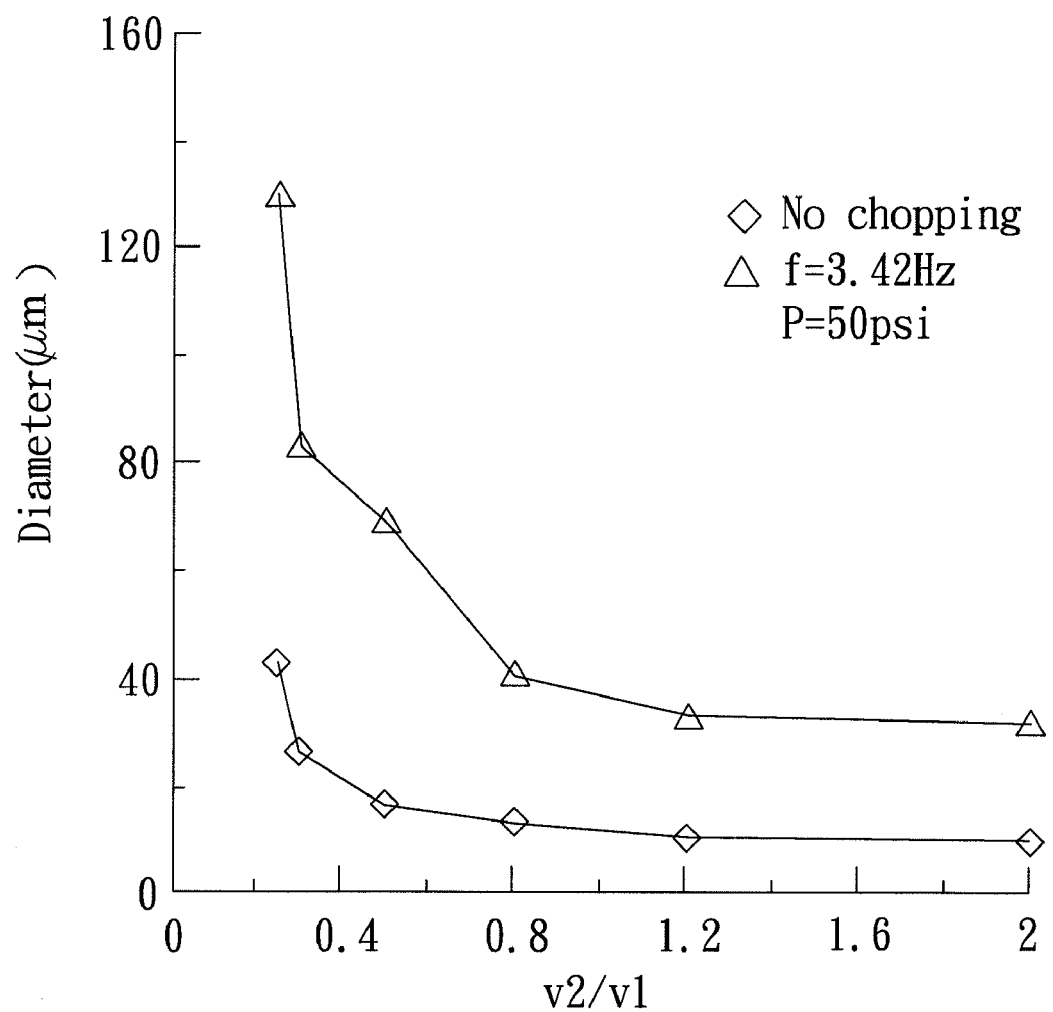
FIGS. 13 and 14 are diagrams showing varying sizes of the microparticles produced in an example.
Figure 14:
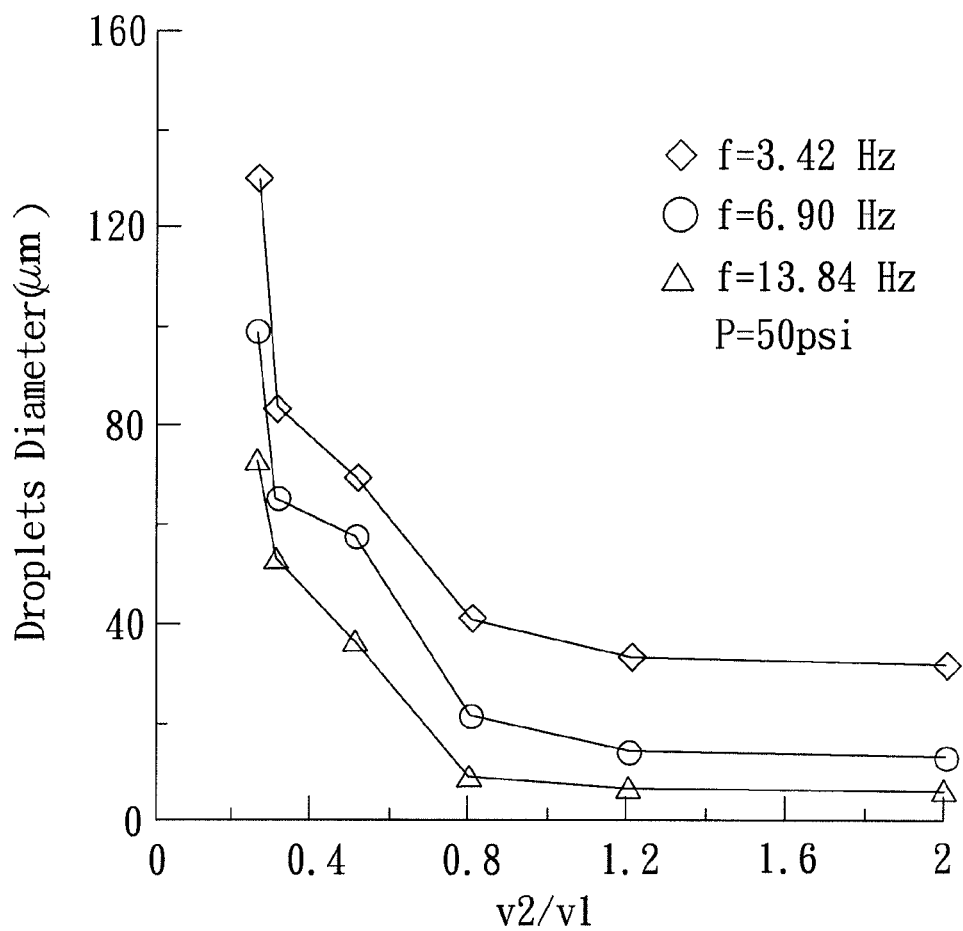

The chip device 500 is used to produce Vitamin C (dispersed phase liquid) microparticles dispersed in ethylhexyl thioglycolate (Trioctanoin) (EHTG, the continuous phase liquid). Ethylhexyl thioglycolate is mixed with a surfactant, DGL (PEG-10 polyglyceryl-2-laurate) in a ratio of 10:1. Vitamin C and ethylhexyl thioglycolate are controlled to flow in the microchannels 525 at predetermined rates. An airflow at a pressure of 50 psi is supplied to the pressurizing channel unit 547 through the pressure inlet/out hole 545. An electromagnetic valve is controlled by a frequency controller such that the pressure in the pressurizing channel unit 547 is increased and decreased at a predetermined frequency and the flowing stream inside the co-flow channel 526 is comminuted at a predetermined frequency. FIGS. 13 and 14 are diagrams which show varying sizes of the microparticles produced in this example at different frequencies and different ratios of the flow rates of the continuous and dispersed phase liquids. $V_2$ represents the flow rate of Vitamin C, whereas $V_1$ represents the flow rate of EHTG.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A method of producing microparticles, comprising:
   (a) providing a co-flow channel having upstream and downstream ends;
   (b) causing a dispersed phase liquid to flow into a flowing body of a continuous phase liquid at the upstream end of the co-flow channel, and allowing the dispersed phase liquid to flow into the co-flow channel together with the continuous phase liquid, wherein the dispersed phase liquid is sheathed by the continuous phase liquid within the co-flow channel; and
   (c) comminuting the continuous phase and dispersed phase liquids in the co-flow channel by intermittently moving a comminuting unit transversely into the co-flow channel to block the co-flow channel at intervals, wherein the microparticles of the dispersed phase liquid are formed within the continuous phase liquid.

2. The method of claim 1, wherein the step (b) includes:
   providing at least two first microchannels, and at least one second microchannel, the first microchannels extending on two sides of the second microchannel and meeting the same at the upstream end of the co-flow channel;
   allowing the continuous phase liquid to flow through the first microchannels; and
   allowing the dispersed phase liquid to flow through the second microchannel,
   wherein the dispersed phase liquid is sheathed by the continuous phase liquid within the co-flow channel.

3. The method of claim 1, further comprising providing a collection chamber for collecting the microparticles at downstream of the co-flow channel.

4. The method of claim 1, wherein the comminuting unit includes a plurality of substantially parallel pressurizing channels extending transversely over the co-flow channel, and a membrane extending between the pressurizing channels and the co-flow channel, and wherein step (c) includes applying a pressure to the pressurizing channels simultaneously so that the pressurizing channels simultaneously pressurize the membrane and the co-flow channel is blocked at a plurality of spaced apart points simultaneously.

5. The method of claim 4, wherein the comminuting unit further includes a pressure inlet hole, and a pressure supply channel connecting the pressure inlet hole to all of the pressurizing channels.

* * * * *